US008768813B2

(12) United States Patent
Palmeri

(10) Patent No.: US 8,768,813 B2
(45) Date of Patent: Jul. 1, 2014

(54) SYSTEM FOR ELECTRONIC RE-ALLOCATION OF A TRANSACTION AMOUNT TO AN INVESTMENT

(71) Applicant: Richard P. Palmeri, North Palm Beach, FL (US)

(72) Inventor: Richard P. Palmeri, North Palm Beach, FL (US)

(*) Notice: Subject to any disclaimer, the term of this patent is extended or adjusted under 35 U.S.C. 154(b) by 0 days.

(21) Appl. No.: 13/680,156

(22) Filed: Nov. 19, 2012

(65) Prior Publication Data

US 2013/0091076 A1 Apr. 11, 2013

Related U.S. Application Data

(63) Continuation of application No. 09/578,085, filed on May 24, 2000, now abandoned.

(51) Int. Cl.
*G06Q 40/00* (2012.01)

(52) U.S. Cl.
USPC .......................................... 705/36 R; 705/39

(58) Field of Classification Search
USPC ........................................... 705/10–44
See application file for complete search history.

(56) References Cited

U.S. PATENT DOCUMENTS

| 5,297,026 | A | | 3/1994 | Hoffman |
| 5,621,640 | A | * | 4/1997 | Burke ........................ 705/14.17 |
| 5,787,404 | A | | 7/1998 | Fernandez-Holmann |
| 5,953,710 | A | | 9/1999 | Fleming |
| 5,970,480 | A | | 10/1999 | Kalina |
| 5,991,736 | A | | 11/1999 | Ferguson et al. |
| 6,070,153 | A | | 5/2000 | Simpson |
| 6,088,682 | A | | 7/2000 | Burke |
| 6,216,115 | B1 | | 4/2001 | Barrameda et al. |
| 6,592,030 | B1 | | 7/2003 | Hardesty |
| 7,620,590 | B2 | * | 11/2009 | Avery ............................ 705/37 |
| 7,676,423 | B2 | * | 3/2010 | Avery ............................ 705/37 |
| 7,877,314 | B2 | * | 1/2011 | Avery ............................ 705/37 |
| 2002/0128942 | A1 | * | 9/2002 | Colosi et al. .................... 705/36 |
| 2005/0167483 | A1 | | 8/2005 | Burke |
| 2006/0122923 | A1 | | 6/2006 | Burke |
| 2006/0206420 | A1 | | 9/2006 | Burke |
| 2007/0094130 | A1 | | 4/2007 | Burke |
| 2007/0130053 | A1 | * | 6/2007 | Avery ............................ 705/37 |
| 2011/0231307 | A1 | * | 9/2011 | Caffrey et al. .................. 705/39 |
| 2013/0091076 | A1 | * | 4/2013 | Palmeri ....................... 705/36 R |

FOREIGN PATENT DOCUMENTS

| WO | WO 94/04979 | | 3/1994 | |
| WO | WO 9404979 | * | 3/1994 | ............. G06F 15/21 |

* cited by examiner

*Primary Examiner* — Frantzy Poinvil
(74) *Attorney, Agent, or Firm* — Novak Druce Connolly Bove + Quigg LLP

(57) ABSTRACT

This system may include a system for electronically reallocating any portion of a transaction by maintaining a user account at a user institution; maintaining a vendor account at a vendor institution; maintaining a user account at a trust institution; initiating a transaction for the transaction amount; electronically distributing the transaction amount from said user account to said vendor account; and electronically distributing at least a portion of the transaction amount from the vendor account to the user account at the trust institution, wherein the portion of the transaction amount in the user account at the trust institution is placed in an investment vehicle. The system of the present invention may further comprise providing an interactive information source between the user and the trust institution, whereby the trust institution can provide information (current or historical) to the user regarding the portion of the transaction amount placed in the investment vehicle.

14 Claims, 3 Drawing Sheets

SYSTEM FOR ELECTRONIC RE-ALLOCATION OF A TRANSACTION AMOUNT TO AN INVESTMENT

CROSS-REFERENCE TO RELATED APPLICATION

Not applicable.

STATEMENT REGARDING FEDERALLY SPONSORED RESEARCH

Not applicable.

REFERENCE TO MICROFICHE APPENDIX

Not applicable.

BACKGROUND OF THE INVENTION

1. Field of the Invention

The present invention relates to a system for automatically re-allocating at least a portion of a transaction amount to an investment system, particularly to a system for diverting a portion of a transaction amount to a user trust for investment for the benefit of the user, and more particularly to a system for diverting a portion of a transaction amount to a user investment trust to grow the funds for the benefits of the user or a designated beneficiary after a set gestation period.

2. Description of the Prior Art

Currently, the typical family is undereducated and or simply not able to save money for their children's steadily increasing cost of education, or to save money for retirement. Most families make only enough to provide for their present needs and do not have the means to take advantage of the many existing tax-advantaged savings systems, such as IRA's, 401K's, and the like.

Thus, lower and middle income families are saddled with the need to provide for their future themselves, but without any additional income to put aside after paying for current expenses.

In the United States, the Social Security System is a future savings system by which individuals are specifically taxed on their income to provide money into a Social Security Fund, from which they are eligible to withdraw funds once they reach a certain age and/or circumstances. Individuals have no direct control over how this Social Security money is to maintained or grown. The funds are controlled directly by the federal government. However, many individuals invest in the aforementioned tax-advantaged savings systems to supplement the money that they will receive from Social Security.

Accordingly, a workable and efficient system is needed which would allow individuals to automatically put money aside now. This money would be invested and grown for their future or their children's future, without the need for them to generate additional funds or manage said funds.

SUMMARY OF THE INVENTION

The present invention is directed to a system by which individual users can have a portion of a transaction with any number of vendors reallocated to a trust organization to invest and grow, without the need for additional direct contribution from the user.

This system may include a system for electronically reallocating a portion of a transaction by maintaining any number of user accounts at a user institution; maintaining any number of vendor accounts at a vendor institution; maintaining a number of user accounts at a trust institution; initiating a transaction for the transaction amount; electronically distributing the transaction amount from said user account to said vendor account; and electronically distributing at least a portion of the transaction amount from the vendor account to the user account at the trust institution, wherein the portion of the transaction amount in the user account at the trust institution is pieced in an investment vehicle.

The system of the present invention may further comprise providing an interactive information source between the user and the trust institution, whereby the trust institution can provide information (current or historical) to the user regarding the portion of the transaction amount placed in the investment vehicle, other vendor information, and possibly direct advertising by vendors to customers

DETAILED DESCRIPTION OF THE PREFERRED EMBODIMENT

The present invention will be understood more fully from the detailed description given below and from the accompanying drawings of preferred embodiments of the invention which, however, should not be taken to limit the invention to a specific embodiment but are for explanation and understanding only.

Figure 1:
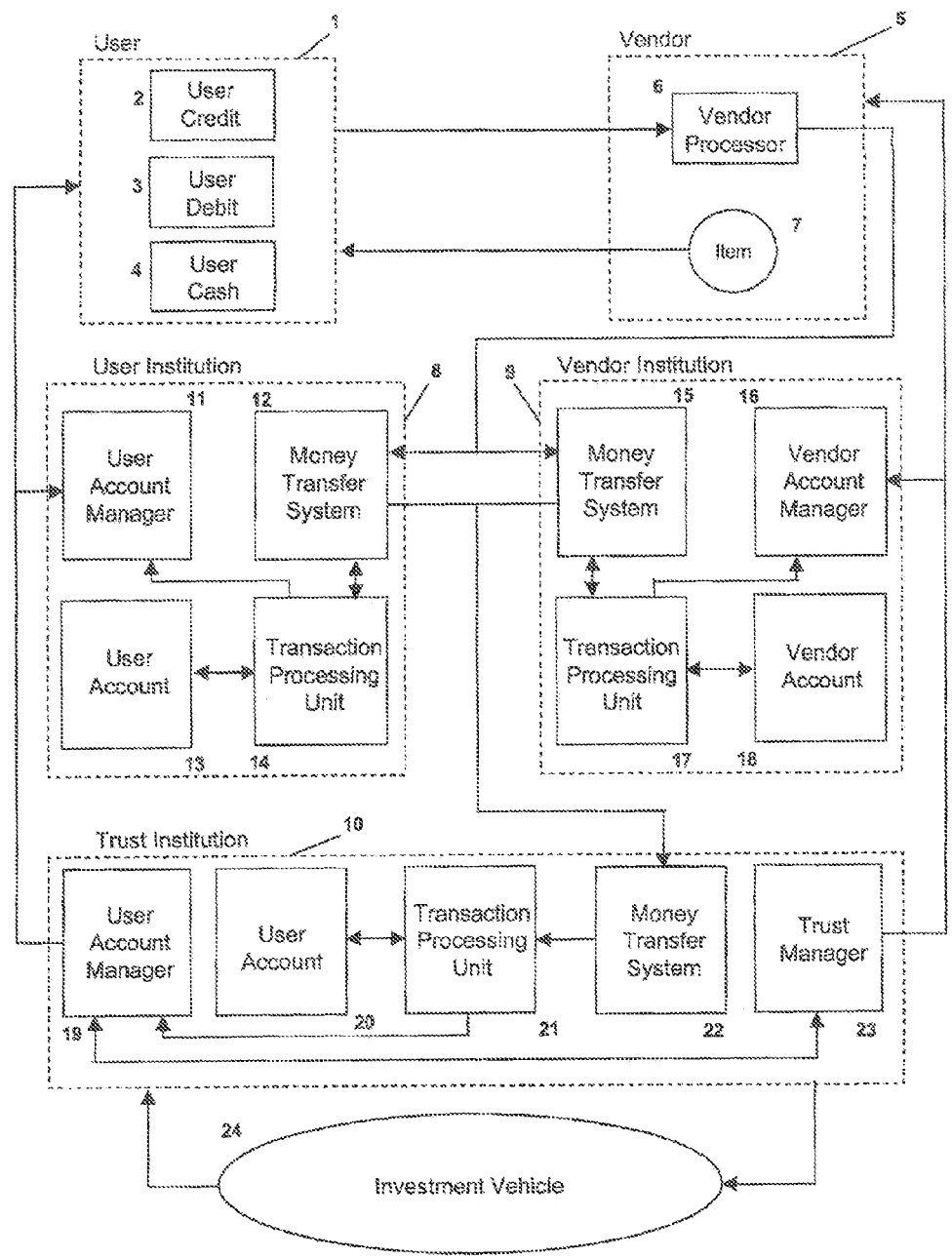
FIG. 1 is a block diagram illustrating a preferred embodiment of the present invention.

FIG. 1 illustrates a preferred embodiment the system of the present invention, independent of the particular transaction medium, e.g., a physical retail store, an Internet Web site, etc. User 1, having some token representing his/her available funds, such as User Credit 2, User Debit 3, or User Cash 4, wishes to make a purchase from Vendor 5.

While FIG. 1 illustrates an embodiment of the present invention using a single user institution and account, vendor institution and account, and trust institution and account, it will be appreciated that the present invention can be used with multiple user, vendor, and trust institutions and multiple accounts at these institutions simultaneously. It will also be appreciated to those of skill in the art that while the present invention is being described in connection with conventional credit cards, debit card, and electronic cash, it is not limited thereto and can be used with any system for identifying a user and transferring funds. For example, biometrics based authentication systems (such as thumb scanners and the like) or an identification card (such as a driver's license and the like) could be used to identify the user, while cash or paper check is used to complete the transaction.

In order to complete the transaction and receive funds from User 1, Vendor 5 uses Vendor Processor 6, allowing User 1 to purchase and obtain Item 7. For example, if User 1 is purchasing Item 7 at a conventional "brick and mortar" location, such as retail store, Vendor Processor 6 may comprise a conventional credit/debit card reader, the operation of which is well known to those in the art. It will be appreciated to those of skill in the art that Item 7 may comprise not only physical products, but financial products (such as mortgages), electronic products (such as computer software), or services (such as service agreements).

As another example, if User 1 is purchasing Item 7 from Vendor 5 via an Internet Web site, Vendor Processor 6 may comprise a system of computer servers and associated software (not shown) either controlled by directly Vendor 5 or by another Vendor contracted to handled Internet based credit card and electronic cash transactions. If a cash or check is used for the transaction, Vendor Processor 6 may comprise, for example, a thumb scanner or card reader.

The operation of Internet based credit card and electronic cash transactions is well known to those of skill in the art and will not be elaborated on specifically here. Additional information relating to such processing can be obtained on the Internet from any of the major credit card organizations, such as at <www.visa.com> or <www.mastercard.com>, the contents of which sites are hereby incorporated by reference herein.

In the preferred embodiment of the system of the present invention, Vendor 5 uses Vendor Processor 6 to communicate with User Institution 8 and the Vendors Institution 9. At least Vendor Institution 9 and possibly User Institution 8 are also in communication with Trust Institution 10, as discussed in more detail below.

User Institution 8 may include a User Account Manager 11, a Money Transfer System 12, User Account 13, and Transaction Processing Unit 14, or any other arrangement of similar components to perform the tasks described in more detail below. User Institution 8 may comprise a credit card company for example, which has previously established User Account 13 for extending credit to User 1. Alternatively, User Institution 8 may comprise the users own bank, where the user may have previously established an account, such as a savings, checking, or money market account, for which the user has been provided a debit card for electronically withdrawing funds from that account.

User Institution 8 may even comprise a "Virtual Bank" or electronic cash provider, (such as DigiCash™ or CyberCash™) through which User 1 has obtained digital coins, representing the equivalent of cash. When User 1 uses these tokens, a record of the transaction is recorded in User Account 13, even though the tokens are passed directly to Vendor Institution 9. The operation of electronic cash systems are well known to those in the art.

User Account Manager 11 is responsible for maintaining the user's account and may include all of the well known sub units required therefore, such as a statement processing unit, an transaction management unit, a customer information unit (which maintains a customer information database), and a customer service unit for interacting with the user. These components may comprise, for example, a system of computers, processing software and database applications. The operation of an account manager and the sub components thereof is well known to those in the art.

The user institution's Money Transfer System 12 may comprise any number of well known systems for processing electronic funds transfers, such as a conventional wire transfer system or EDI (electronic data interchange) VAN (value added networks). These well known, conventional systems are regularly used by banks, credit card companies, and other financial institutions to safely and securely transfer fund electronically among them. These systems regularly employ high level cryptography to securely encode the financial information transmitted therebetween. Communication between to and from Money Transfer System 12 is not particularly limited, and may include, for example the use of analog and digital telephone lines, the Internet, and secure private networks.

Processing of User Account 13 (e.g. debiting funds, reducing available credit, recording electronic cash transfer, identifying the user) is handled by Transaction Processing Unit 14, which is in communication with User Account 13, Money Transfer System 12 and User Account Manager 11. Transaction Processing Unit 14 is responsible processing the transaction on the user's end. Transaction Processing Unit may include the appropriate personnel and data processing equipment (not shown) for processing the transaction for the user. Again, the operation of the actual transaction processing is well known in the art.

Similarly to User Institution 6, Vendor Institution 9 may include Vendor Account Manager 16, a Money Transfer System 15, User Account 18, and Transaction Processing Unit 17, or any other arrangement of similar components to perform the tasks described in more detail below. For example, User Account 18 may comprise the vendors own merchant account, which may be in communication with the vendors checking or other business account or accounts.

Trust Institution 10 may include its own User Account Manager 19, User Account 20, Transaction Processing Unit 21, Money Transfer System 22, and Trust Manager 23 or any other arrangement of similar components to perform the tasks described in more detail below. Trust Institution 10 places at least a portion of the funds in trust User Account 19 in investment Vehicle 24.

User Account 20 is preferably a separate account for User 1, which is maintained by User Account Manager 19 and the overall Trust Manager 23 for the direct benefit of User 1, although not necessarily limited thereto. The funds from trust User Account 20 may be placed in investment Vehicle 24 individually by trust User Account Manager 19 or collectively as a pool of trust assets. Placement of assets may also be managed in part directly by Trust Manager 23. It will be appreciated that User Account Manager 19 and overall Trust Manager 23 may also be the same unit.

Investment Vehicle 24 may comprise any number of investment vehicles and investment organizations well known to those in the art and to the general public. For example, investment Vehicle 24 may include one or more of selected industry growth funds, mutual funds, managed stock portfolios, and the like. In the preferred embodiment of the invention, the investment and growth of the funds in trust User Account 20 is handled by an organization within investment Vehicle 24, and not directly by Trust Institution 10, also both are possible under the invention.

Information on the progress of the funds in the trust may be provided to User 1 from Trust Institution 10 by User Account Manager 19. This may be accomplished through any number of weir-known mechanisms, such as a monthly, quarterly, or annual statement (either in paper or electronic form) or through the use of interactive portal, such as an Internet Web site or a Kiosk system. Information from Trust Institution 10 may be provided to Vendor 5 in a similar manner. Use of such mechanisms to provide information to User 1 from User institution 8 is currently in practice by banks, credit card companies and e-cash providers, most of which provide a fully interactive Web site for viewing accounts, making payments, and inquiring as to transactions.

The embodiment of the invention shown in FIG. 1 operates as follows.

User 1 wishes to purchase Item 7 from Vendor 5 and presents (either physically if in a "brick and mortar" store, or electronically if online) his/her payment card to make the purchase. Vendor 5 then processes the card, such as by swiping it through a card reader. This begins the transaction processing. The sale price of Item 7, for purposes of this example is arbitrarily set to $20.

Vendor Processor 6 then contacts Money Transfer Systems 12 and 15 at User Institution 8 and Vendor Institution 9, respectively. Of course, it will be appreciated that in some circumstances a single money transfer system may be employed. For example. User Institution 6 and Vendor Institution 9 may be the same organization, or may use the same Wire Transfer Service or EDI VAN.

Under a pre-existing arrangement with Trust Institution 10, Vendor 5 has agreed to is allocate a portion of the sale price of Item 7—in this example arbitrarily set to $1—to User Account 20 under the care of Trust Institution 10. In a secondary embodiment of the invention, User Institution 8 and/or User 1 may also have arranged to allocate a separate portion of User Account 13 to the trust User Account 20 for investment.

For example, a parent may want to match a portion of purchases made on behalf of their children (or simply their own purchases) to the trust account for the benefit of those children. Or, User 1 may want to allocate a preset small amount of his/her own funds into the trust as a retirement vehicle. Alternatively, credit card companies may be given incentives to allocate a portion of interest proceeds on purchases to the trust account with each purchase. However, for purposes of this description of the preferred embodiment, the amount contributed from User Institution 8 is $0.

Money Transfer System 12 forwards the request for a $20 transfer of funds from User Institution 8 to Transaction Processing Unit 14. Transaction Processing Unit 14 processes the transaction, electronically withdrawing the funds (as in the case of a debit card), or processing the transaction for credit (as in the case of a credit card) or recording the transfer (as in the case of participating electronic cash services. Transaction Processing Unit 14 communicates this information to User Account Manager 11 in a conventional manner.

Thereafter, Transaction Processing Unit 14 sends the entire $20 sale price to Vendor Institution 9. Transaction Processing Unit 17 may credit Vendor Account 18 for the full $20, and thereafter debit $1 for deposit in trust User Account 20 by the means previously described. Or, Transaction Processing Unit 17 may only credit $19 of the $20 to Vendor Account 18, and forward the remaining $1 to Trust Institution 10.

Alternatively, Transaction Processing Unit 14 sends $19 of the $20 through Money Transfer System 12 to Vendor Institution 9, and sends $1 of the $20 to Trust Institution 10 via Money Transfer System 22. Money Transfer System 22, may, of course, be the same as either Money Transfer System 12 or 15, as previously described. This $1 deposit is credited to trust User Account 20. The remaining $19 is credited to Vendor Account 18 by Transaction Processing Unit 17 in Vendor Institution 9.

In the case of electronic cash, Vendor Processor 6 sends a request to the user's "cyberwallet," for the transfer of electronic "coins" to the Vendor Institution 9. Each electronic coin is actually a computer file containing specially encrypted coding, which identifies the specific denomination of the "coin" and User Institution 8. Transaction Processing Unit 14 is capable of generating and authenticating the electronic coins.

A cyberwallet is actually a software application that organizes and maintains the user's coins. The cyberwallet could be located on the user's own computer, or could reside on another machine found elsewhere, such as with User Institution 8 directly.

After the request is received by the users cyberwallet, the electronic coins are then sent to Vendor Institution 9. When Vendor Institution 9 receives the coins, it then sends a request to User Institution 8 to authenticate and validate the coins value, in this case $20. User institution 8 receives this information and processes the request. This is accomplished by taking the identifying information from the coin (or coins, if more than one was used) and comparing it to the account information archived on its system. The user's account would then be debited by $20, and the merchant's account would be credited by $20. Thereafter, Transaction Processing Unit 17 in Vendor Institution 9 would transfer $1 to Trust Institution 10, as previously described.

By making the re-allocation of a portion of the transaction price come directly from the vendor's sale price, the transaction is invisible to User 1, and does not require him/her to fund User Account 20 in Trust Institution 10. Instead, User Account 20 is funded by Vendor 5. Vendor 5 in turn receives direct benefits from this arrangement through its tremendous marketing appeal, which provides a significant incentive for User 1 to shop with them. Also, Vendor 5 may receive tax incentives as well. User 1 is provided the significant advantage that he/she can now have investment funds working for him/her—without the need to invest his/her own funds.

Trust Institution 10 then invests and manages the funds from trust User Account 20 into investment Vehicle 24. This is preferably accomplished by regular electronic transfers in a manner similar to the aforementioned point-of-purchase transfer, but may also be accomplished through paper and physical transfers as well.

Figure 2:
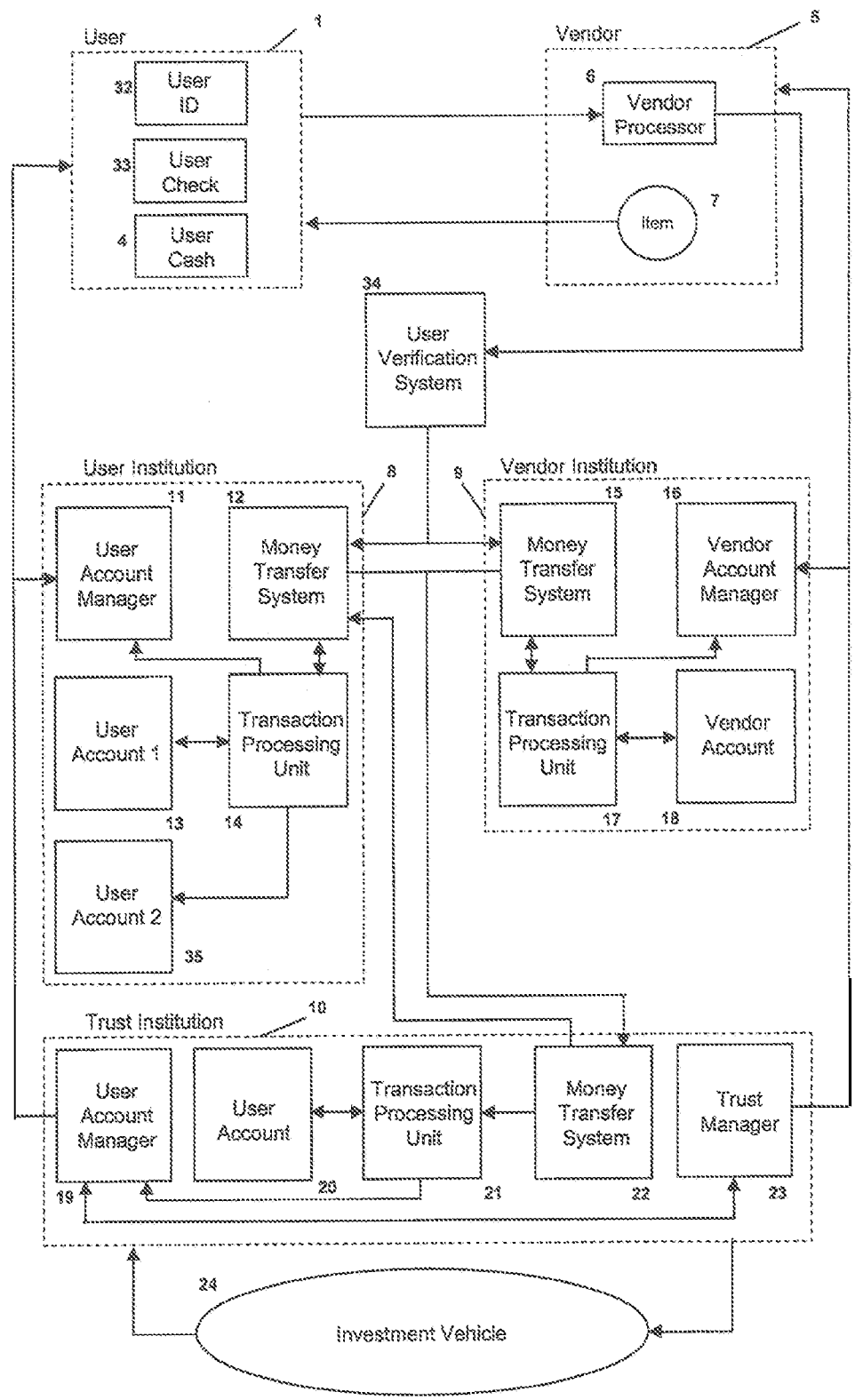
FIG. 2 is a block diagram illustrating a second preferred embodiment of the present invention.

FIG. 2 shows a second preferred embodiment of the invention. While FIG. 2 illustrates an embodiment of the present invention using a single user institution, vendor institution, and trust institution, it will be appreciated that the present invention can be used with multiple user, vendor, and trust institutions simultaneously.

User 1 may use User ID 32 as a source of identification in the transaction with Vendor 5 when using User Check 33 or User Cash 4 (and also when using User Credit 2 or User Debit 3, as previously described). As discussed above, User ID 32 is not particularly limited and may comprise anything that uniquely identifies the user, such as a physical identification card containing a magnetic information strip (e.g., a driver's license). The user identification could also be made through the use of biometrics. For example, a Vendor Processor 6 may include a thumb or finger print scanner and the like.

Once the user identification information is obtained from the user, Vendor Processor 6 may then communicate with User Verification System 34 to verify the identity of the user. It will to be appreciated that User Verification System 34 may incorporate a independent source of verification, such as an independent database of state driver's license information that is accessible by Vendor 5, or may be incorporated completely into User Institution 8, such as an internally maintained database of user account information. The database of user account information may also be maintained by User Account Manager 11.

One of the advantages of using an independent identification system (government issued or private) is that it allows for a third party user id to more easily authorize transactions with multiple user, vendor, and trust institutions. Of course, under proper agreements, one card from one of User Institutions 8 could also authorize the transaction exchange for each of the multiple user, vendor, and trust institutions.

User Institution 8 may comprise a credit card company, for example, and User ID 32 may comprise a special ID card issued by a third party having an agreement with a number credit card companies (and also a number of different vendors and trust institutions). When this special ID card is presented by User to Vendor 5, User ID 32 is checked against the database at third party User Identification System 34 to authorize the transaction.

User Identification System 34 may contain identify in information regarding the user trust accounts for User 1 at Trust Institution 10 to allow Vendor 5 to properly allocate funds to the trusts. User identification systems and the operation of searchable databases are well known in the art and therefore will not be further elaborated on here.

Of course, it is not necessary that Vendor 5 verify User ID 32 at the time of the transaction. User Verification System 34 may also be maintained directly by Vendor 5, such as in a database or other record system either at the purchase location or at Vendor Institution 9.

Once User 1 is identified, then Vendor 5 may deposit User Cash 4 or User Check 33. Alternatively, Vendor 5 may cash User Check 33 at User Institution 8 or with some third party to receive cash. Once Vendor 5 has the cash, then Vendor 5 may user the information in User Verification System 34 to distribute funds to the user trust account at Trust Institution 10 for User 1 in the manner previously described.

Regardless of the manner of payment made by User 1 (credit, debit, cash, check, etc.), User 1 may separately maintain User Account 13 and a second User Account 35 preferably together at User Institution 8 or at separate institutions. This will allow a portion of the funds transferred from Vendor Institution 9 to Trust Institution 10 to be distributed to the second User Account 35.

For example, User Institution 8 or Vendor Institution 9 may have an incentive program whereby for certain types of purchases, User 1 may receive "cash back" or points (such as with conventional credit card cash back or airline mile programs) for a beneficiary to be named by them.

For purposes of illustration, a parent may obtain a User Credit 2 or User Debit 3 at User Institution 8 for a child. Whenever purchases are made by the child (or parent) using this card, the appropriate portion of the transaction amount are earmarked for the child's trust account at User Institution 10. However, if a certain level or type of purchase is achieved, a portion of this amount may be returned or credited to the parent's account or to a special spending account for the child.

The actual transfer of funds may occur in any of the aforementioned manners. For example. The "cash back" may retained by User Institution 8 at the time of the transaction and credited immediately to second User Account 35. Alternatively, the funds may be transferred back by Vender Institution 9 or by Trust Institution 10 before any of the funds are credited to the user's trust account.

Figure 3:
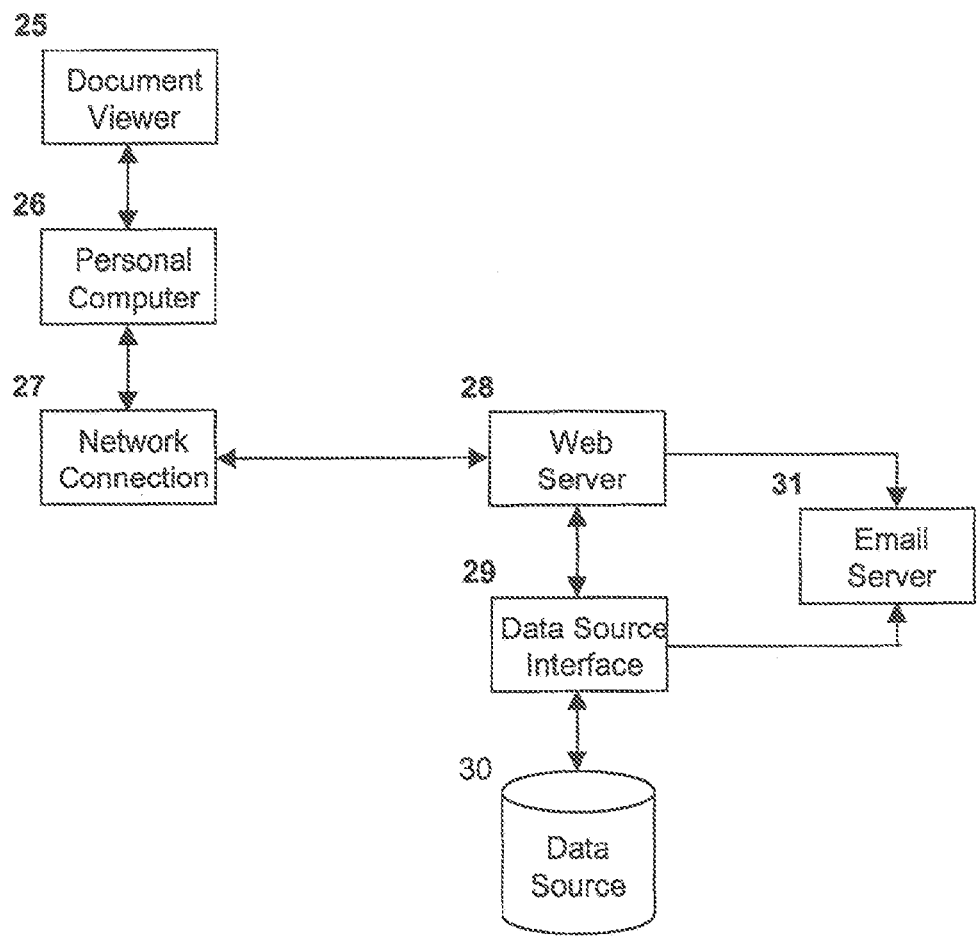
FIG. 3 is a block diagram illustrating the preferred embodiment of the interactive information source of the present invention.

Trust Institution 10 can keep User 1 informed as to the status of the funds in User Account 20 and the details of investment Vehicle 24 in a variety of ways, as previously mentioned. The use of an interactive Web site for this purpose is illustrated in FIG. 3. Those of ordinary skill in the art will appreciate that the present invention, while described below in connection with its use over the Internet, is certainly not limited thereto.

An electronic document, such as a Web page created using HTML, is loaded into Document Viewer 25. Document Viewer 25 may be any software application capable of is viewing electronic documents and loading additional electronic documents from within the original document, such as through the use of a hypertext link or form (although not limited thereto).

For example, the Document Viewer could include a Web browser, such as Navigator from Netscape Communications or Microsoft's Internet Explorer. The electronic document may be loaded automatically when Document Viewer 1 is first started, or may be opened into the viewer by the user from a file stored locally or at a remote address. For example, the user may load the document by typing the document's address into the Web browsers command line.

Document Viewer 25 may be accessed by the user through any of a number of computer systems, such as through the use of a terminal connected to a mainframe system, from a personal computer, or over computer connected to a local computer network.

Document Viewer 25 is connected to the Internet along with Personal Computer 26, through Network Connection 27. This connection is typically made through local telephone fines using an analog, ISDN, or DSL connection, though it can be over a direct network connection, such as an Ethernet network and leased line. Network Connection 27 may be a computer network that routes any requests from Document Viewer 1 to the appropriate location on the Internet. This operation is well known to those of skill in the art. Network Connection 27 connects Document Viewer 25 to Web Server 28 through any of a number of well-known connection schemes, such as through the use of leased lines. This combination essentially comprises User Interface 8 in this particular preferred embodiment of the invention.

Web Server 28 is typically a software application running on a remote computer that is capable of forwarding or processing requests from Document Viewer 25. For example, Web Server 28 may include any one of a number of well-known server applications, such as the NSCA Web server, the Apache Web server, etc. Web Server 28 passes a document request from Document Viewer 25 to Data Source Interface 29 for accessing Data Source 30. Data Source 30 contains information on each user and that user's trust account, such as the amount deposited, a record of deposits, the amount of growth in funds due to investment Vehicle 24, how Investment Vehicle 24 is investing the funds, which organizations comprise Investment Vehicle 24, etc.

After a document, such as an HTML form (or series of forms), is loaded into Document Viewer 25, the user enters in the appropriate information and activates a hypertext link or form "Submit" button, generating a signal back to Data Source Interface 29. This is preferably in the form of an HTTP request sent over the Internet using TCP IP and possibly a Secure Socket Layer ("SSL"). The request may be routed through Network Connect on 27 and through Web Server 28 to Data Source Interface 29. It will be appreciated that the details of HTTP operation in conjunction with TCP/IP and SSL are well known to those of ordinary skill in the art and will, therefore, not be elaborated on here.

When the HTTP request is received by Data Source Interface 29, it accesses Data Source 30 to retrieve the requested information based upon the signal from Document Viewer 25. In one embodiment of the invention, a common gateway interface ("CGI") program, well known to those of skill in the art, may be used to parse the data from Document Viewer 25. This program acts as an interface between the Web Server 28 and/or Data Interface 29 and Data Source 30 by executing a set of instructions. The interaction of Web servers and CGI programs and the sending of information between them is well Known to those of ordinary skill in the art.

The CGI program may extract the document information from the information passed to it by the server and retrieve the appropriate information from Data Source 30. This may be accomplished in a number of ways known to those of ordinary skin in the art. For example, if the CGI program is a PERL script or other API, a database access module can be used to interface with the majority of commercial relational database applications. Examples of such databases include Oracle, Sybase, SQL Server, and the like. It is also possible for these systems to be accessed directly by Web Server 28 using their own internal data engines.

Information is submitted to or extracted from Data Source 30, depending on the signal sent by the Document Viewer 25. Data Source Interface 29 then generates a signal back to Document Viewer 25 through Web Server 28. User 1 can even send requests for additional information to User Account Manager 19 or Trust Manager 23 via email through Email Server 31. The operation of Internet-based email is well known to those of skill in the art and will not be elaborated upon here.

Although this invention has been described with reference to particular embodiments, it will be appreciated that many variations may be resorted to without departing from the spirit and scope of this invention. For example, the user interface, data source interface, and data source of the present invention may comprise a single software application, and may be operated from a single computer or a network of computers via the Internet or an internal intranet. Moreover, for example, a network of personal computers may be used, a mainframe system, or a server and peripheral thin clients.

I claim:

1. A method of electronically reallocating a portion of a transaction amount in a transaction between a user and a vendor, comprising the steps of:
    performing a transaction between said user and said vendor for exchange of at least one item to be provided to the user and a transaction amount required for said at least one item to be provided to the vendor, said performing comprising: identifying at least one user account associated with the user; identifying at least one vendor account associated with the vendor; and electronically distributing at least a portion of said transaction amount from said at least one user account to said at least one vendor account;
    determining whether the vendor and a separate trust institution have a pre-defined arrangement to allocate a portion of said transaction to at least one user trust account associated with at least one beneficiary and managed by the trust institution; and
    in response to determining that the vendor and the trust institution have said pre-defined arrangement, identifying at least one user trust account associated with the user and electronically distributing at least a portion of said transaction amount from said at least one vendor account to said at least one user trust account according to said pre-define arrangement, wherein said portion of said transaction amount in said user trust account is placed in an investment vehicle by the trust institution.

2. The method of claim 1, wherein said at least one user account is one or more selected from the group consisting of a credit card account, a checking account, and a savings account.

3. The method of claim 1, further comprising the step of providing an interactive information source between said at least one beneficiary and said trust institution, whereby said trust institution provides information to said at least one beneficiary regarding said portion of said transaction amount placed in said investment vehicle and associated with said at least one beneficiary.

4. The method of claim 3, wherein said interactive information source is a Web site.

5. The method of claim 3, wherein said interactive information source is a kiosk system.

6. The method of claim 1, wherein the determining further comprises:
    receiving identification information for the user;
    verifying the identification information; and
    identifying the pre-defined arrangement based on the identification information.

7. The method of claim 1, wherein said at least one beneficiary comprises at least one of said user or one or more other users.

8. A system for electronically reallocating a portion of a transaction amount in a transaction between a user and a vendor, comprising:
    at least one processor;
    at least one memory having stored thereon a plurality of instructions for causing the at least one processor to perform the steps of:
        performing a transaction for exchange of at least one item to be provided to said user and a transaction amount for said at least one item, said performing comprising: identifying at least one user account associated with the user, identifying at least one vendor account associated with the vendor, and electronically distributing at least a portion of said transaction amount from said at least one user account to said at least one vendor account;
        determining whether the vendor and a separate trust institution have a pre-defined arrangement to allocate a portion of said transaction to at least one user trust account associated with at least one beneficiary and managed by the trust institution; and
        in response to determining that the vendor and the trust institution have said pre-defined arrangement, identifying at least one user trust account associated with the user and electronically distributing at least a portion of said transaction amount from said at least one vendor account to said at least one user trust account, wherein said portion of said transaction amount in said user trust account is placed in an investment vehicle by the trust institution.

9. The system of claim 8, wherein the determining further comprises:
    receiving identification information for the user;
    verifying the identification information; and
    identifying the pre-defined arrangement based on the identification information.

10. The system of claim 8, wherein said at least one beneficiary comprises at least one of said user or one or more other users.

11. The system of claim 8, wherein said at least one user account is one or more selected from the group consisting of a credit card account, a checking account, and a savings account.

12. The system of claim 8, further comprising an interactive information source in communication with said at least one beneficiary and said trust institution, whereby said trust institution provides information to said user regarding said portion of said transaction amount placed in said investment vehicle.

13. The system of claim 12, wherein said interactive information source comprises a Website.

14. The system of claim 12, wherein said interactive information source comprises a kiosk system.

* * * * *